US012598405B2

(12) United States Patent
Matsuda et al.

(10) Patent No.: US 12,598,405 B2
(45) Date of Patent: Apr. 7, 2026

(54) OPTICAL TRANSMISSION/RECEPTION SYSTEM AND OPTICAL TRANSMISSION/RECEPTION METHOD

(71) Applicant: NTT, Inc., Tokyo (JP)

(72) Inventors: Toshiya Matsuda, Musashino (JP);
Masahiro Nakagawa, Musashino (JP);
Kana Masumoto, Musashino (JP);
Kota Nishiyama, Musashino (JP)

(73) Assignee: NTT, Inc., Tokyo (JP)

( * ) Notice: Subject to any disclaimer, the term of this patent is extended or adjusted under 35 U.S.C. 154(b) by 258 days.

(21) Appl. No.: 18/289,174

(22) PCT Filed: May 10, 2021

(86) PCT No.: PCT/JP2021/017652
§ 371 (c)(1),
(2) Date: Nov. 1, 2023

(87) PCT Pub. No.: WO2022/239054
PCT Pub. Date: Nov. 17, 2022

(65) Prior Publication Data
US 2024/0223921 A1 Jul. 4, 2024

(51) Int. Cl.
*H04Q 11/00* (2006.01)
*H04L 1/00* (2006.01)

(52) U.S. Cl.
CPC ....... *H04Q 11/0003* (2013.01); *H04L 1/0061* (2013.01)

(58) Field of Classification Search
CPC .............. H04L 1/0061; H04Q 11/0003; H04B 7/2656; H04B 10/40; H04B 10/50; H04B 10/60
See application file for complete search history.

(56) References Cited

U.S. PATENT DOCUMENTS 6,307,985 B1 * 10/2001 Murakami ....... H04B 10/25253
385/24
6,433,904 B1 * 8/2002 Swanson .................. H04L 1/22
398/91

(Continued)

FOREIGN PATENT DOCUMENTS

JP 2006352499 A * 12/2006

OTHER PUBLICATIONS

Matsuda et al., "A study of inter-remote memory direct link with pluggable wavelength tunable optical modules and error-correcting code memories," IEICE Technical Report, Mar. 2020, 119(442):7-11, 11 pages (with English translation).

*Primary Examiner* — Hibret A Woldekidan
(74) *Attorney, Agent, or Firm* — Fish & Richardson P.C.

(57) ABSTRACT

In an optical transmitter, an error correction and coding unit performs error correction and coding on data. A framer unit adds header information to n pieces of error-corrected and coded data to generate a frame signal. A frame dividing unit divides the data of the frame signal into n pieces, adds the header information to head of each of the n pieces of divided data, and generates n frame signals obtained by adding different CRC values to end. Optical transmission units convert the n frame signals into optical signals of different wavelengths and transmit them to n optical transmission paths. Optical reception units of an optical receiver receive n optical signals and convert them into n frame signals of electrical signals. A frame synthesizing unit determines whether at least one of the n frame signals has an correct CRC value without an error.

8 Claims, 5 Drawing Sheets

(56) References Cited

U.S. PATENT DOCUMENTS

| | | | |
|---|---|---|---|
| 11,108,898 B1 * | 8/2021 | Lee ..................... | H04B 7/2656 |
| 2003/0204806 A1 * | 10/2003 | Hisada .................. | H03M 13/31 |
| | | | 714/758 |
| 2022/0209870 A1 * | 6/2022 | Matsuda ............. | H04B 10/516 |

* cited by examiner

Fig. 2

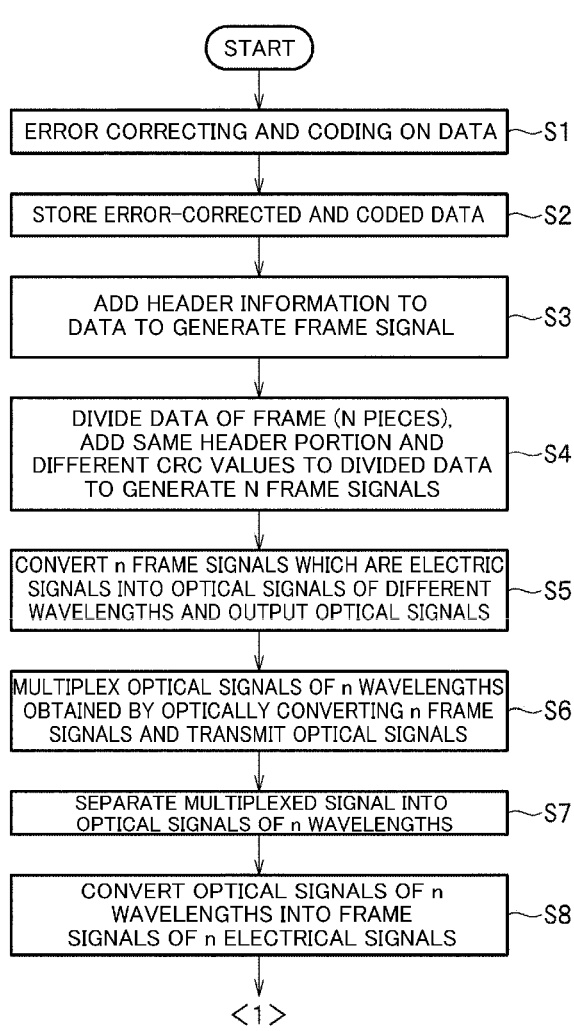

```
                    ┌──────────┐
                    │  START   │
                    └──────────┘
                          │
                          ▼
      ┌─────────────────────────────────────────┐
      │  ERROR CORRECTING AND CODING ON DATA    │──S1
      └─────────────────────────────────────────┘
                          │
                          ▼
      ┌─────────────────────────────────────────┐
      │  STORE ERROR-CORRECTED AND CODED DATA   │──S2
      └─────────────────────────────────────────┘
                          │
                          ▼
      ┌─────────────────────────────────────────┐
      │          ADD HEADER INFORMATION TO      │
      │      DATA TO GENERATE FRAME SIGNAL      │──S3
      └─────────────────────────────────────────┘
                          │
                          ▼
      ┌─────────────────────────────────────────┐
      │      DIVIDE DATA OF FRAME (N PIECES),   │
      │       ADD SAME HEADER PORTION AND       │
      │  DIFFERENT CRC VALUES TO DIVIDED DATA   │──S4
      │        TO GENERATE N FRAME SIGNALS      │
      └─────────────────────────────────────────┘
                          │
                          ▼
      ┌─────────────────────────────────────────┐
      │ CONVERT n FRAME SIGNALS WHICH ARE ELECTRIC │
      │  SIGNALS INTO OPTICAL SIGNALS OF DIFFERENT │──S5
      │  WAVELENGTHS AND OUTPUT OPTICAL SIGNALS │
      └─────────────────────────────────────────┘
                          │
                          ▼
      ┌─────────────────────────────────────────┐
      │ MULTIPLEX OPTICAL SIGNALS OF n WAVELENGTHS │
      │ OBTAINED BY OPTICALLY CONVERTING n FRAME │──S6
      │  SIGNALS AND TRANSMIT OPTICAL SIGNALS   │
      └─────────────────────────────────────────┘
                          │
                          ▼
      ┌─────────────────────────────────────────┐
      │     SEPARATE MULTIPLEXED SIGNAL INTO    │
      │    OPTICAL SIGNALS OF n WAVELENGTHS     │──S7
      └─────────────────────────────────────────┘
                          │
                          ▼
      ┌─────────────────────────────────────────┐
      │       CONVERT OPTICAL SIGNALS OF n      │
      │            WAVELENGTHS INTO FRAME       │──S8
      │      SIGNALS OF n ELECTRICAL SIGNALS    │
      └─────────────────────────────────────────┘
                          │
                          ▼
                        <1>
```

OPTICAL TRANSMISSION/RECEPTION SYSTEM AND OPTICAL TRANSMISSION/RECEPTION METHOD

CROSS-REFERENCE TO RELATED APPLICATIONS

This application is a National Stage application under 35 U.S.C. § 371 of International Application No. PCT/JP2021/017652, having an International Filing Date of May 10, 2021.

The disclosure of the prior application is considered part of the disclosure of this application, and is incorporated by reference in its entirety into this application.

TECHNICAL FIELD

The present invention relates to an optical transmission/reception system and an optical transmission/reception method for transmitting an optical signal on which data coded with an error correcting code (ECC) is superimposed from an optical transmitter to an optical transmission path, receiving the transmitted optical signal by an optical receiver, and correcting data if there is an error in the data.

BACKGROUND ART

In recent years, there has come to be demand for a large-capacity transmission system in which data centers are connected each other via an optical transmission path including an optical fiber and an optical amplifier, with a background of a rapid increase in traffic between data centers. The conventional system has generally used a dedicated wavelength division multiplexing (WDM) transmission system. An optical signal such as that of Ethernet (TM) output from a server or a router in the data center is accommodated in a transponder of a WDM transmitter, mapped to a frame signal including ECC data for long-distance transmission, and then transmitted as a WDM signal.

As a system of this type, there is an optical transmission/reception system in which an optical transmitter and an optical receiver using separate remote computers are connected via an optical transmission path. In this optical transmission/reception system, data subjected to ECC coding (error correction and coding) by a framer including an ECC function in the optical transmitter is framed, then converted into an optical signal, and transmitted to an optical transmission path. The transmitted optical signal is received by the optical receiver from the optical transmission path, framing is released by a deframer including the ECC function to acquire data, and when there is a bit error in the data, error correction is performed.

The framer and the deframer including the ECC function are generally constituted of an application specific integrated circuit (ASIC) from the viewpoint of power consumption and the like, and the coding gain of the ECC is designed in accordance with the maximum transmission distance of several thousand km or the like to be assumed. The conventional ECC technique has been intended to expand the coding gain of the ECC for the purpose of applying a longer-distance transmission. It is known that a relation between the coding gain of the ECC and the signal processing time is that the signal processing time is extremely increased when the coding gain is increased (NPL 1).

CITATION LIST

Non Patent Literature

[NPL 1] "A study of inter-remote memory direct link with pluggable wavelength tunable optical modules and error-correcting code memories" Toshiya Matsuda et al., IEICE Technical Report Vol. 119, No. 442, BPN 2019-54, pp. 7-11, (2019).

SUMMARY OF INVENTION

Technical Problem

In the optical transmission/reception system as a computer network which is made up of transmission paths of relatively short distances and requires a strict delay time, if the WDM transmitter having the above-mentioned high coding gain is applied, the delay time is increased. Therefore, in the technique of the above-mentioned NPL 1, the framer and the deframer are separated from the ECC function to enable optimization of the coding gain according to the transmission distance, thereby shortening the transmission delay time.

However, in this technique, error correcting code (ECC) is not applied to a header portion of the frame signal generated by the framer. Therefore, when there is a bit error in the header portion, after it is known that the header portion cannot be corrected by error correction and decoding of the data including this header portion, the frame signal is discarded. When the frame signal is discarded in this way, the same frame signal needs to be re-transmitted. However, since it takes a long time to discard the frame signal, there is a problem of an increase in the transmission delay.

The present invention has been made in view of such circumstances, and an object of the present invention is to suppress increase in transmission delay at the time of re-transmission of a frame signal transmitted via an optical transmission path between the optical transmitter and the optical receiver.

Solution to Problem

In order to solve the above problem, an optical transmission/reception system according to the present invention is an optical transmission/reception system which includes an optical transmitter having n optical transmission units which transmit optical signals; and an optical receiver having n optical reception units which are connected to the n optical transmission units via optical transmission paths and receive the n optical signals transmitted via the optical transmission paths. Each of the optical transmitters includes a frame division unit which divides data of a first frame signal framed by adding header information to data into n pieces, replicates the header information according to the number of the n divisions, adds the replicated header information to a head of each piece of n-divided data, adds different cyclic redundancy check (CRC) values to an end of each data to form a frame, and generates n frame signals that are framed electrical signals. The n optical transmission units convert each of the n frame signals into optical signals having different wavelengths and transmit the optical signals to the optical transmission path. The n optical reception units receive the optical signals of n wavelengths from the optical transmission paths and convert the optical signals into n frame signals of electrical signals. The optical receiver includes a frame synthesizing unit which determines whether there is a correct CRC value without errors in at least one of the converted n frame signals, and when it is determined that at least one CRC value is correct without errors, synthesizes n pieces of data of all the n frame signals with header information of the frame signal of the correct CRC value to generate a second frame signal. Here, n is a positive integer.

Advantageous Effects of Invention

According to the present invention, it is possible to suppress an increase in transmission delay at re-transmission of a frame signal transmitted via an optical transmission path between the optical transmitter and the optical receiver.

BRIEF DESCRIPTION OF DRAWINGS

FIG. 2 is a first flowchart for explaining optical transmission/reception operations performed by the optical transmission/reception system according to the embodiment.

DESCRIPTION OF EMBODIMENTS

Hereinafter, embodiments of the present invention will be described with reference to the drawings. However, the same reference signs are given to components having corresponding functions in all the drawings of the present specification, and the description thereof will be omitted as appropriate.

Configuration of Embodiment

Figure 1:
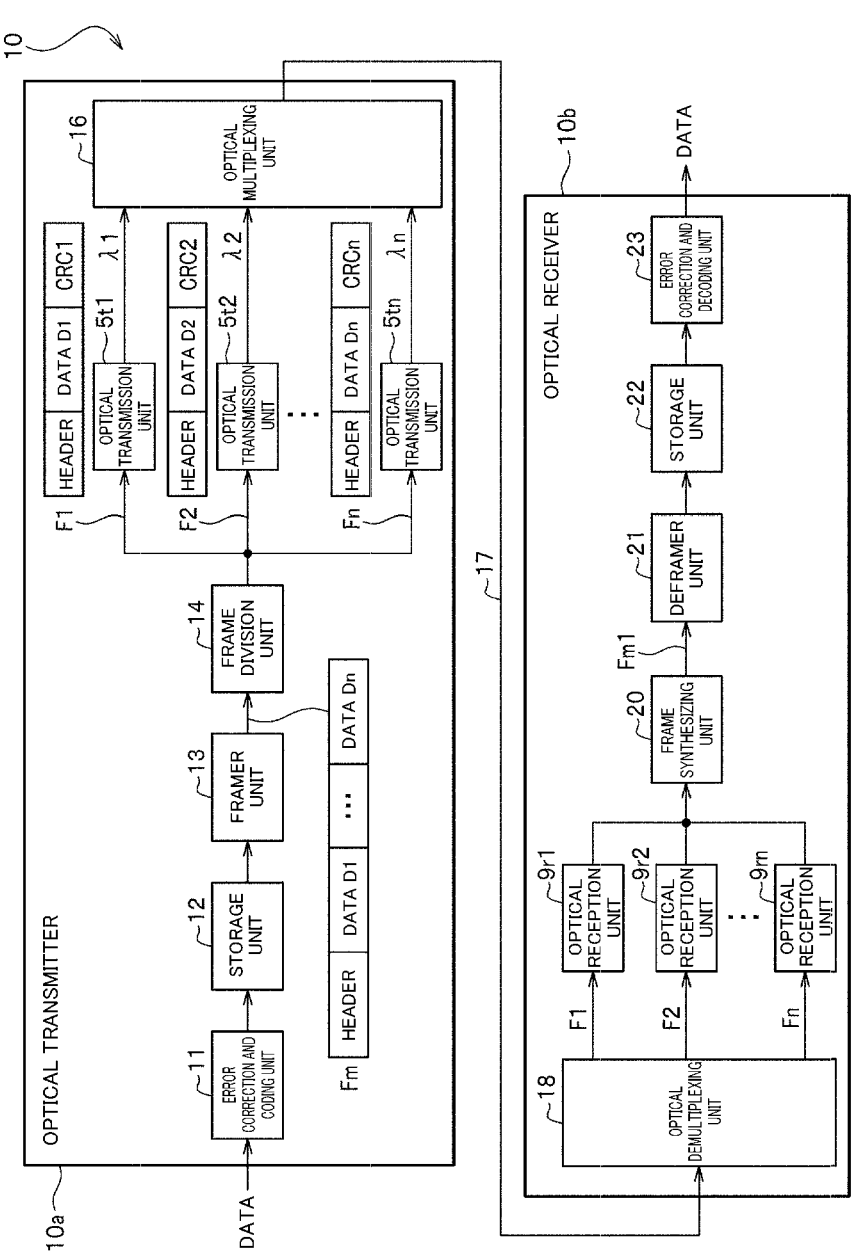
FIG. 1 is a block diagram showing a configuration of an optical transmission/reception system according to an embodiment of the present invention.
Figure 3:
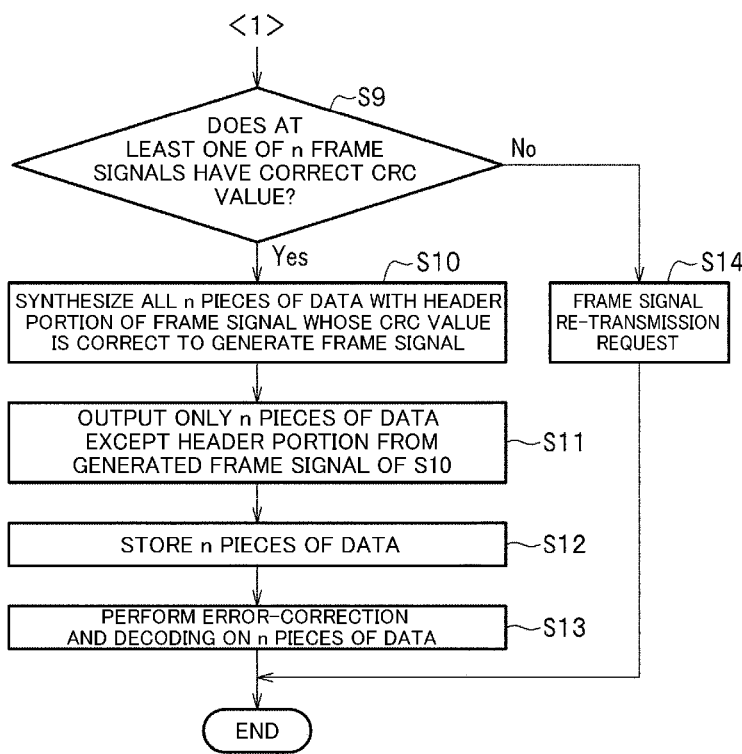
FIG. 3 is a second flow chart for explaining optical transmission/reception operations performed by the optical transmission/reception system according to the embodiment.

FIG. 1 is a block diagram showing a configuration of an optical transmission/reception system according to an embodiment of the present invention.

An optical transmission/reception system (also referred to as a system) 10 shown in FIG. 1 has a configuration in which an optical transmitter 10a and an optical receiver 10b having computers separated from each other at a remote place are connected via one optical transmission path 17 provided with an optical fiber and an optical amplifier.

The optical transmitter 10a is configured to include an error correction and coding unit 11, a storage unit 12, a framer unit 13, a frame division unit 14, a plurality (n) of optical transmission units 5t1, 5t2, . . . , and 5tn, and an optical multiplexing unit 16.

The optical receiver 10b is configured to include an optical demultiplexing unit 18 connected to the optical multiplexing unit 16 and an optical transmission path 17, n optical reception units 9r1, 9r2, . . . , and 9rn, a frame synthesizing unit 20, a deframer unit 21, a storage unit 22, and an error correction and decoding unit 23.

The error correction and coding unit 11 performs error correction and coding (also referred to as coding) on the data, using the error correcting code (ECC).

The storage unit 12 stores the coded data therein.

The framer unit 13 generates a frame signal Fm by giving header information (shown as a header in FIG. 1) to the stored data and framing the data. A frame section in which header information is stored is referred to as a header portion, and a frame section in which data is stored is referred to as a data unit. The frame signal Fm generated by the framer unit 13 constitutes the first frame signal described in the claims.

A frame division unit 14 divides data stored in the data part of the generated frame signal Fm into D1 to Dn, respectively, and replicates the header portion of the frame signal Fm by the number (n) of the separate pieces of data D1 to Dn. The replicated same header portion is added to the head of each of the data D1 to Dn, and different cyclic redundancy check (CRC) values (CRC1, CRC2, . . . , and CRCn) are added to the end of n pieces of data D1 to Dn to form a frame.

The frame division unit 14 generates n frame signals F1, F2, . . . , and Fn by the framing. The generated frame signal F1 is constituted of header+data D1+CRC1, the frame signal F2 is constituted of header+data D2+CRC2, and the frame signal Fn is constituted of header+data Dn+CRCn.

The optical transmission units 5t1 to 5tn convert each of n frame signals F1 to Fn being electric signals into optical signals of different wavelengths λ1 to λn by an optical/electric conversion function and output them to the optical multiplexing unit 16.

The optical multiplexing unit 16 multiplexes optical signals of n different wavelengths λ1 to λn obtained by electrically/optically converting frame signals F1 to Fn being n electric signals from the optical transmission units 5t1 to 5tn by multiplexing, and transmits the multiplexed signals to the optical transmission path 17.

The optical demultiplexing unit 18 separates the multiplexed signal from the optical transmission path 17 into n optical signals of different wavelengths λ1 to λn by demultiplexing, and outputs the demultiplexed signals to n optical reception units 9r1 to 9rn.

The optical reception units 9r1 to 9rn receive the optical signals of n different wavelengths λ1 to λn separated by the optical demultiplexing unit 18, and convert them into frame signals F1 to Fn of the electric signals by the electric/optical conversion function.

The frame synthesizing unit 20 checks whether the CRC values of the n frame signals F1 to Fn are correct without bit errors, and synthesizes the n pieces of error correction-encoded data D1 to Dn of the n frame signals F1 to Fn with the header portion of the frame signal (for example, the frame signal F1) whose CRC value is correct to generate a frame signal Fm1. The frame signal Fm1 generated by the frame synthesizing unit 20 constitutes a second frame signal described in the claims.

When the frame synthesizing unit 20 determines that none of the n frame signals F1 to Fn has a correct CRC value, the re-transmission request of all the frame signals may be made by a control request unit (not shown) (or frame synthesizing unit 20) of the optical receiver 10b.

The deframer unit 21 outputs error correction-encoded data after removing the header portion from the frame signal Fm1 that is output from the frame synthesizing unit 20.

The storage unit 22 stores the error-corrected and encoded data therein.

The error correction and decoding unit 23 performs error correction and decoding of the data stored in the storage unit 22.

In the frame synthesizing unit 20, it can be checked whether a bit error occurs in the header portion of each of the frame signals F1 to Fn and the data D1 to Dn by checking each CRC value of the n frame signals F1 to Fn. However, in this checking, for example, if a bit error occurs in the frame signal Fn, it cannot be determined whether a bit error occurs in either the header portion of the frame signal Fn or the data Dn.

However, even if a bit error occurs in the data Dn of the frame signal Fn, the bit error can be corrected as follows. That is, the frame synthesizing unit 20 synthesizes all the n pieces of data D1 to Dn including data Dn of bit error occurrence to the header portion of a normal frame signal F1 in which no bit error occurs, and generates a frame signal Fm. Since the n pieces of data D1 to Dn in the generated frame signal Fm are error-corrected and coded by the error correction and decoding unit 23, the data Dn of bit error generation is error-corrected and coded at this time.

In this way, when it is detected that there is no bit error even in one frame signal F1, since the frame synthesizing unit 20 synthesizes n pieces of data D1 to Dn to the header portion using the header portion of the correct frame signal F1 to generate the frame signal Em1, the n pieces of data D1 to Dn can be error-corrected and coded. However, when it is detected that bit errors are generated in all the n frame signals F1 to Fn, the frame signal Fm1 cannot be generated, but since the probability of generating bit errors in all the n frame signals becomes extremely low, the probability of exhibiting the performance of error correction and decoding in the error correction and decoding unit 23 becomes high.

Operation of Embodiment

The optical transmission/reception operation of the optical transmission/reception system 10 according to the embodiment will be described below with reference to a flowchart shown in FIG. 2.

In step S1 shown in FIG. 2, the error correction and coding unit 11 performs error correction and coding on the data. In step S2, the coded data are stored in the storage unit 12. In step S3, the framer unit 13 generates the frame signal Fm by giving header information to the stored data and framing the data.

In step S4, a frame division unit 14 divides data stored in the data part of the generated frame signal Fm into D1 to Dn, respectively, and replicates the header portion of the frame signal Fm by the number of divisions (n pieces). The replicated same header portion is added to the head of the individual data D1 to Dn, and different CRC values (CRC1 to CRCn) are added to the ends of n pieces of data D1 to Dn to form the frame, and n frame signals F1 to Fn are generated.

In step S5, the optical transmission units 5t1 to 5tn convert each of n frame signals F1 to Fn being electric signals into optical signals of different wavelengths λ1 to an and output them to the optical multiplexing unit 16.

In step S6, the optical multiplexing unit 16 multiplexes optical signals of n different wavelengths λ1 to λn obtained by performing electric/optical conversion of frame signals F1 to Fn being n electric signals by multiplexing, and transmits the multiplexed signal to the optical transmission path 17.

Next, in step S7, the optical demultiplexing unit 18 of the optical receiver 10b separates the multiplexed signal from the optical transmission path 17 into n optical signals of different wavelengths λ1 to λn by demultiplexing, and outputs them to n optical reception units 9r1 to 9rn.

In step S8, each of the optical reception units 9r1 to 9rn receives the optical signals of n wavelengths λ1 to Δn from each of the optical transmission paths 17a to 17n, and converts them into n frame signals Fa to Fn of electric signals.

In step S9, the frame synthesizing unit 20 determines (checks) whether a correct CRC value exists in at least one of the n frame signals F1 to Fn.

If it is determined that the CRC value of one frame signal (for example, the frame signal F1) is correct (Yes) as a result of the determination, the frame synthesizing unit 20 synthesizes n pieces of data D1 to Dn of all n frame signals F1 to Fn to the header portion of the frame signal F1 whose CRC value (CRC1) is correct to generate a frame signal Fm1 in step S10.

Next, in step S11, the deframer unit 21 removes the header portion from the correct frame signal F1 of the CRC value output from the frame synthesizing unit 20, and outputs data obtained by synthesizing n pieces of data D1 to Dn remaining thereafter to the error correction and decoding unit 23. In step S12, the storage unit 22 stores the data thereof. In step S13, the error correction and decoding unit 23 performs error correction and decoding of the data stored in the storage unit 22. At this time, data D2 to Dn related to frame signals F2 to Fn in which bit errors occur are error-corrected and coded.

On the other hand, if it is determined that all the n frame signals F1 to Fn have no correct CRC value (N0) in step S9, a frame signal re-transmission request is made by a control request unit (not shown) of the optical receiver 10b in step S14. After the re-transmission request, the process returns to step S1 and the process is performed.

Meanwhile, even if the ECC functions of the optical transmitter 10a and the optical receiver 10b are used, it is not guaranteed that the bit error is completely zero, and the frame signal including the bit error which cannot be corrected is discarded.

Here, an application in which data omission of calculation or the like is not permitted is assumed. In this application, since it is necessary to re-transmit the frame signal of the same packet when the frame signal is discarded, the probability of discarding the frame signal (frame loss rate: FLR) greatly affects the delay performance. Therefore, in the optical transmission/reception system 10 of the embodiment, the effect of the present invention is confirmed by using the FLR.

In other words, the FLR is the probability of occurrence of a bit error in one frame signal. The probability of generating two or more bit errors in one frame signal is extremely small compared to the probability of generating one bit error.

Therefore, the FLR is substantially equal to the probability that one bit error occurs in one frame signal.

Now, it is assumed that a bit error rate (BER) after error correction by the ECC function is performed on the BER $r_e$ after transmission is shown with $r_c$. The FLR in the case of transmitting a frame of header length=h bits and data length=nd bits becomes $(h+nd)r_c$ before the ECC application and $(h+nd)r_c$ after the ECC application.

In the case of the above-described technique of the NPL 1, since the ECC function is applied only to the data part, the FLR becomes $hr_e+(1-hr_e)ndr_c$. The first term is a probability of generating a bit error in the header portion, and the second term is a probability of generating a bit error in the data part after error correction.

In the present invention, since one frame signal Fm (FIG. 1) is converted into n frame signals F1 to Fn of header length=h bit and data length=nd bit, the FLR becomes $\{(h+d)\ r_c\}^n+1-\{(h+d)r_e\}^n]ndr_c$.

Figure 4:
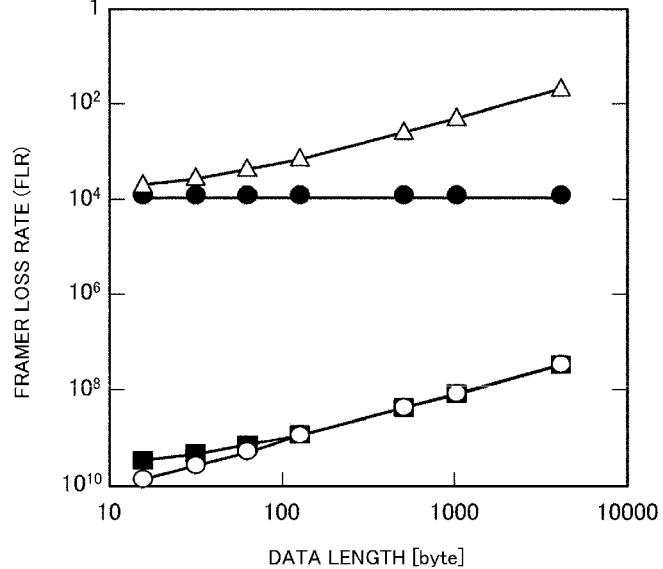
FIG. 4 is a diagram showing a relationship between a data length (byte) and a frame loss rate (FLR) in the transmission characteristics between the optical transmitter and the optical receiver of the prior art and the present invention.

When Hamming codes (72, 64) in the technology of the NPL 1 are used as the error correcting codes, the BER of $r_e=6\times10^{-7}$ can be corrected to $r_c=10^{-12}$, In this transmission characteristic, frame loss rate (FLR) for the data length (byte) of the present invention when the number of wavelengths n=4 is shown by o in FIG. 4. For comparison, in FIG. 2, the result of the prior art for transmitting and receiving frame signals as they are without using the ECC function is shown with A, the result of the prior art for applying the ECC to the entire frame signals is shown with ■, and the result of the technique of the NPL 1 for applying the ECC only to the data part of the frame signals is shown with •.

In the prior art, as indicated by Δ and ■, FLR increases in proportion to the frame length obtained by synthesizing the header length and the data length.

On the other hand, in the FLR • in the prior art, since the probability of occurrence of a bit error in the header portion without the ECC function is dominant, the FLR becomes substantially constant regardless of the data length.

When the technique of the present invention is used, the probability of occurrence of a bit error in the header portion is sufficiently small compared to the probability of occurrence of a bit error in the data part after error correction. Therefore, the FLR has a value substantially equal to that of the prior art in which the ECC function is applied to the entire frame signal, as indicated by o.

Therefore, in the optical transmission/reception system 10 of the embodiment, the signal processing delay is reduced by applying the optimum ECC function depending on the transmission distance independently of the framer unit 13, and at the same time, an increase in the transmission delay related to the packet re-transmission due to the frame loss can be prevented by correcting the bit error occurring in the header portion.

Effect of Embodiment

Effects of the optical transmission/reception system 10 according to the embodiment will be described.

(1a) An optical transmission/reception system 10 includes an optical transmitter 10a having n optical transmission units 5t1 to 5tn which transmit an optical signal; and an optical receiver 10b having n optical reception units 9r1 to 9rn which are connected to the n optical transmission units 5t1 to 5tn via optical transmission paths 17a to 17n and receive the n optical signals transmitted via the optical transmission paths 17a to 17n.

The optical transmitter 10a includes a frame division unit 14 which divides data of a first frame signal Fm framed by adding header information to data into n pieces of data D1 to Dn, replicates the header information by the number of the n divisions, adds the replicated header information to head of each piece of n-divided data D1 to Dn, adds different CRC values to end of each data D1 to Dn to form a frame, and generates n frame signals that are framed electrical signals.

The n optical transmission units 5t1 to 5tn convert each of the n frame signals into optical signals having different wavelengths and transmit the optical signals to the optical transmission paths 17a to 17n. The n optical reception units 9r1 to 9rn receive the optical signals of n wavelengths from the optical transmission paths 17a to 17n and convert the optical signals into n frame signals of electrical signals.

The optical receiver 10b includes a frame synthesizing unit 20 which determines whether there is a correct CRC value without errors in at least one of the converted n frame signals, and when it is determined that at least one CRC value is correct without errors, synthesizes n pieces of data of all the n frame signals with header information of the frame signal of the correct CRC value to generate a second frame signal.

According to this configuration, when at least one CRC value of the n frame signals is correct without error, the n pieces of data of all the n frame signals can be error-corrected and coded from the second frame signal at a post stage of the frame synthesizing unit 20. On the other hand, when there are errors in all the CRC values in the n frame signals, the re-transmission request of the frame signals can be made without performing the process of the error correction and decoding, as in the prior art. In the prior art, by performing the error-correction and decoding on the data D1 to Dn of the frame signal having the error, the frame signal is discarded after it is known that the error cannot be corrected. The re-transmission request of the frame signal needs to be made after a predetermined time until the discard has elapsed. For this reason, it takes time to request re-transmission of the frame signal, and the transmission delay of the frame signal has been increased. However, in the present invention, since it takes less time than that of the prior art to request the re-transmission request as described above, it is possible to suppress an increase in transmission delay of a frame signal between the optical transmitter 10a and the optical receiver 10b via the optical transmission paths 17a to 17n.

(2a) The optical transmission paths 17a to 17n are configured so that the number thereof is n and they have the same length.

According to this configuration, the n optical transmission units 5t1 to 5tn and the n optical transmission units 5t1 to 5tn can be connected via the n optical transmission paths 17a to 17n of the same length individually.

(3a) The optical receiver 10b is configured to include a deframer unit 21 which outputs data obtained by synthesizing n pieces of data D1 to Dn after removing header information from the generated frame signal Fm1, and an error correction and decoding unit 23 which performs error correction and decoding on the data output from the deframer unit 21.

According to this configuration, in the optical receiver 10b, when at least one CRC value of the n frame signals is correct without error, the n pieces of data D1 to Dn of all the n frame signals can be error-corrected and coded.

(4a) The frame synthesizing unit 20 is configured to instruct that the entire frame signal should be re-transmitted when there is an error in all the CRC values.

According to this configuration, when all CRC values in the n frame signals have errors, the re-transmission request of the frame signal can be made without performing the process of error correction and decoding, as in the prior art. In the prior art, the frame signal is discarded after it is known that the error cannot be corrected, by performing the error correction and decoding on the data of the frame signal having an error. The re-transmission request of the frame signal needs to be made after a predetermined time until the discard has elapsed. For this reason, it takes time to request re-transmission of the frame signal, and the transmission delay of the frame signal has been increased. However, in the present invention, it takes less time than that of the prior art to request the re-transmission as described above, it is possible to suppress an increase in the transmission delay of the frame signal between the optical transmitter and the optical receiver via the optical transmission path. The entire frame signal can be re-transmitted and exchanged again.

Configuration of Modified Embodiment

Figure 5:
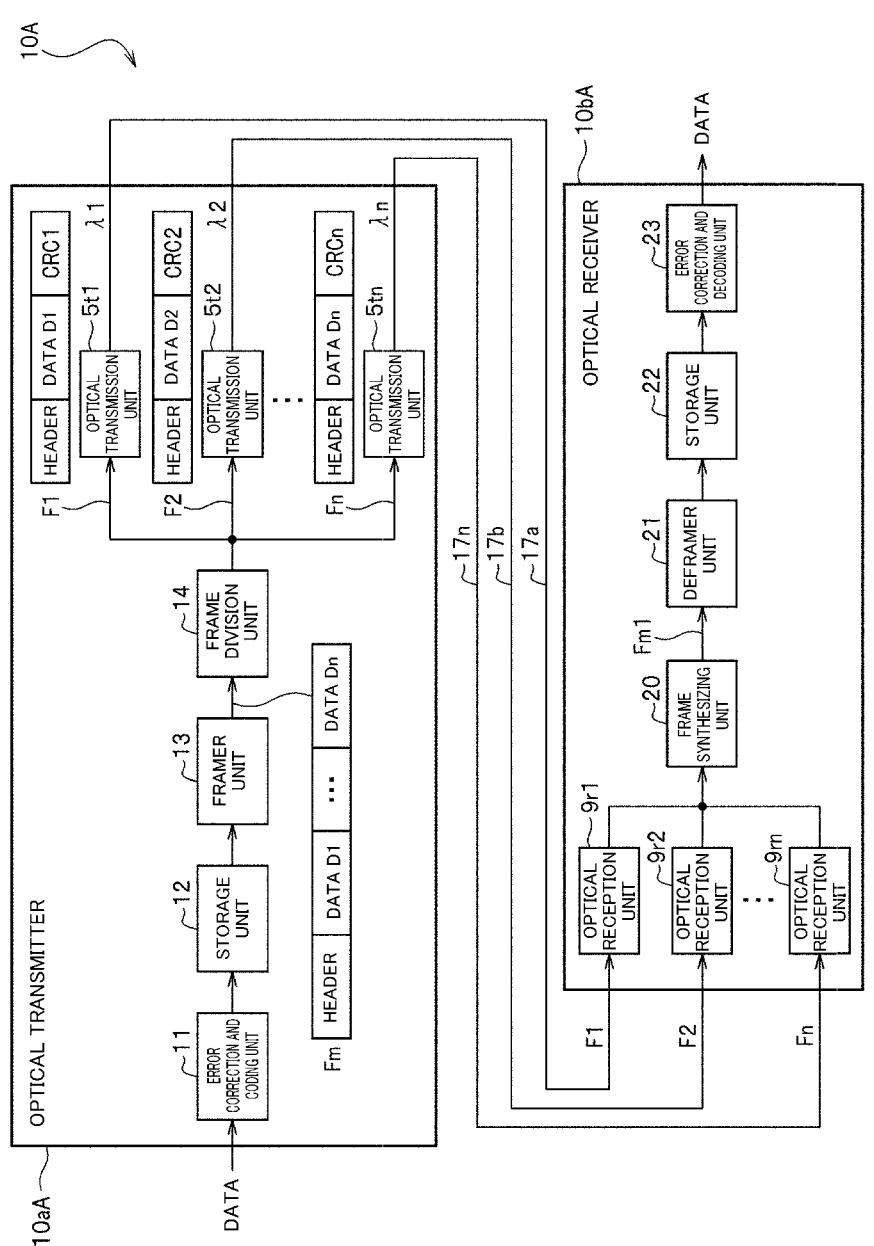
FIG. 5 is a block diagram showing the configuration of an optical transmission/reception system according to a modified embodiment.

FIG. 5 is a block diagram showing a configuration of an optical transmission/reception system according to a modified embodiment of the present invention.

The optical transmission/reception system 10A of the modified embodiment shown in FIG. 5 differs from the optical transmission/reception system 10 (FIG. 1) of the embodiment in that an optical transmitter 10aA does not include the optical multiplexing unit 16, and an optical receiver 10bA does not include the optical demultiplexing unit 18. Furthermore, the optical transmitter 10aA and the optical receiver 10bA are connected each other via a plurality (n) of optical transmission paths 17a, 17b, . . . , and 17n including the optical fibers and the optical amplifiers. However, all of the n optical transmission paths 17a to 17n between the optical transmitter 10aA and the optical receiver 10bA have the same length. Therefore, distances between the respective optical transmission units 5t1 to 5tn and the respective optical reception units 9r1 to 9rn are the same, and propagation delay time is also the same.

The optical transmission units 5t1 to 5tn of the optical transmitter 10aA convert individual n frame signals F1 to Fn being electric signals into optical signals of different wavelengths $\lambda 1$ to $\lambda n$ by an optical/electric conversion function, and transmit them. The frame signal F1 is converted into an optical signal of a wavelength $\lambda 1$ and transmitted to an optical reception unit 9r1 via the optical transmission path 17a, the frame signal F2 is converted into an optical signal of a wavelength $\lambda 2$ and transmitted to an optical reception unit 9r2 via the optical transmission path 17b, and the frame signal Fn is converted into an optical signal of a wavelength $\lambda n$ and transmitted to an optical reception unit 9rn via the optical transmission path 17n.

The optical reception units 9r1 to 9rn of the optical receiver 10bA receive optical signals of n wavelengths $\lambda 1$ to $\lambda n$ by the electric/optical conversion function and convert them into frame signals F1 to Fn of the electric signals.

That is, in the optical transmission/reception system 10A of the modified embodiment, since the configurations of the optical transmitter 10aA and the optical receiver 10bA are simplified compared to the aforementioned embodiment, the cost can be reduced.

Effect (1) Provided is an optical transmission/reception system which includes an optical transmitter having n optical transmission units which transmit optical signals; and an optical receiver having n optical reception units which are connected to the n optical transmission units via optical transmission paths and receive the n optical signals transmitted via the optical transmission paths. The optical transmitter includes a frame division unit which divides data of a first frame signal framed by adding header information to data into n pieces, replicates the header information by the number of the n divisions, adds the replicated header information to head of each piece of n-divided data, adds different cyclic redundancy check (CRC) values to end of each data to form a frame, and generates n frame signals that are framed electrical signals. The n optical transmission units convert each of the n frame signals into optical signals having different wavelengths and transmit the optical signals to the optical transmission path. The n optical reception units receive the optical signals of n wavelengths from the optical transmission paths and convert the optical signals into n frame signals of electrical signals. The optical receiver includes a frame synthesizing unit which determines whether there is a correct CRC value without errors in at least one of the converted n frame signals, and when it is determined that at least one CRC value is correct without errors, synthesizes n pieces of data of all the n frame signals with header information of the frame signal of the correct CRC value to generate a second frame signal.

According to this configuration, when the CRC error is detected, the header information is discarded and the deframer can be performed. Thus, even if there is an error in the data part, error correction and decoding is enabled. Further, by replicating and making only the header information redundant and reconstructing the frame only by SRC check, the probability of frame discard can be greatly reduced. Thus, even for a frame signal including a bit error, error correction and decoding can be performed independently of a deframer.

(2) Provided is the optical transmission/reception system described in (1) in which the number of the optical transmission paths is n, and the optical transmission paths has the same length.

According to this configuration, the n optical transmission units and the n optical transmission units can be individually connected by n optical transmission paths of the same length.

(3) Provided is the optical transmission/reception system described in (1) or (2), in which the optical transmitter further includes an optical multiplexing unit which multiplexes n optical signals of different wavelengths from the n optical transmission units, the optical receiver includes an optical demultiplexing unit that demultiplexes the multiplexed n optical signals, and in place of the optical transmission path, the optical multiplexing unit and the optical demultiplexing unit are connected by one optical transmission path.

According to this configuration, since the optical transmitter and the optical receiver can be connected by one optical transmission path, the cost can be reduced compared to an optical transmission/reception system in which n optical transmission paths are connected.

(4) Provided is the optical transmission/reception system described in any one of (1) to (3) in which the optical receiver includes a deframer unit which outputs data obtained by synthesizing n pieces of data after removing header information from the second frame signal generated by the frame synthesizing unit, and an error correction and decoding unit which performs error correction and decoding on the data output from the deframer unit.

According to this configuration, n pieces of data of all n frame signals can be error-corrected and coded from the second frame signal.

(5) Provided is the optical transmission/reception system described in (1) in which the frame synthesizing unit instructs that the entire frame signal should be re-transmitted when all CRC values have errors.

According to this configuration, when all CRC values in the n frame signals have errors, the re-transmission request of the frame signal can be made without performing the error correction and decoding processing as in the prior art. Thus, since time is not taken until the re-transmission request as in the prior art, it is possible to suppress an increase in transmission delay of the frame signal between the optical transmitter and the optical receiver via the optical transmission path.

In addition, the specific configuration can be appropriately changed without departing from the spirit of the present invention.

REFERENCE SIGNS LIST 10, 10A Optical transmission/reception system
10a, 10aA Optical Transmitter
10b, 10bA Optical receiver
11 Error correction and coding unit
12, 22 Storage unit
13 Framer unit
14 Frame division unit
5t1 to 5tn Optical transmission unit
17, 17a to 17n Optical transmission path
16 Optical multiplexing unit
18 Optical demultiplexing unit
9r1 to 9rn Optical reception unit
Frame synthesizing unit
21 Deframer unit
23 Error correction and coding unit
D1 to Dn Data
Fm, Fm1 Frame signal
F1 to Fn Frame signal
$\lambda 1$ to $\lambda n$ Optical wavelength

The invention claimed is:

1. An optical transmission/reception system comprising: an optical transmitter having n optical transmission units configured to transmit optical signals; and an optical receiver having n optical reception units that are connected to the n optical transmission units via optical transmission paths and configured to receive the n optical signals transmitted via the optical transmission paths, wherein the optical transmitter includes
a frame division unit configured to divide data of a first frame signal framed by adding header information to data into n pieces, replicate the header information by the number of the n divisions, add the replicated header information to head of each piece of n-divided data, add different cyclic redundancy check (CRC) values to end of each data to form a frame, and generate n frame signals that are framed electrical signals,
the n optical transmission units are configured to convert each of the n frame signals into optical signals having different wavelengths and transmit the optical signals to the optical transmission path,
the n optical reception units are configured to receive the optical signals of n wavelengths from the optical transmission paths and convert the optical signals into n frame signals of electrical signals,
the optical receiver includes a frame synthesizing unit configured to determine whether there is a correct CRC value without errors in at least one of the converted n frame signals, and when it is determined that at least one CRC value is correct without errors, the frame synthesizing unit is further configured to synthesize n pieces of data of all the n frame signals with header information of the frame signal of the correct CRC value to generate a second frame signal, and
wherein n is a positive integer.

2. The optical transmission/reception system according to claim 1,
wherein the number of the optical transmission paths is n, and the optical transmission paths have the same length.

3. The optical transmission/reception system according to claim 1,
wherein the optical transmitter further includes an optical multiplexing unit configured to multiplex n optical signals of different wavelengths from the n optical transmission units,
the optical receiver includes an optical demultiplexing unit configured to demultiplex the multiplexed n optical signals, and
in place of the optical transmission path, the optical multiplexing unit and the optical demultiplexing unit are connected by one optical transmission path.

4. The optical transmission/reception system according to claim 1, wherein the optical transmitter includes
an error correction and coding unit configured to perform error correction and coding on data from the optical transmission path, and
a framer unit configured to add header information to the error correction-encoded data to form a frame, and output the framed data to the frame division unit, and
the optical receiver includes
a deframer unit configured to output data obtained by synthesizing n pieces of data after removing header information from the second frame signal generated by the frame synthesizing unit, and
an error correction and decoding unit configured to perform error correction and decoding on the data output from the deframer unit.

5. The optical transmission/reception system according to claim 1,
wherein the frame synthesizing unit is configured to instruct the entire frame signal to be re-transmitted when all CRC values have errors.

6. An optical transmission/reception method of an optical transceiver system comprising: an optical transmitter having n optical transmission units configured to transmit optical signals; and an optical receiver having n optical reception units that are connected to the n optical transmission units through n optical transmission paths and are configured to receive the n optical signals transmitted via the optical transmission paths, wherein the optical transmission paths have the same length,
the optical transmitter is configured to perform operations comprising
dividing data of a first frame signal framed by adding header information to data into n pieces, replicating the header information by the number of the n divisions, adding the replicated header information to head of each piece of n-divided data, adding different cyclic redundancy check (CRC) values to end of each data to form a frame, and generating n frame signals that are framed electrical signals, and
converting each of the n frame signals into optical signals having different wavelengths and transmitting the optical signals to the n optical transmission paths, and the optical receiver executes
receiving the optical signals of n wavelengths from the n optical transmission paths and converting the optical signals into n frame signals of electrical signals, and
determining whether there is a correct CRC value without errors in at least one of the converted n frame signals, and when it is determined that at least one CRC value is correct without errors, synthesizing n pieces of data of all the n frame signals with header information of the frame signal of the correct CRC value to generate a second frame signal, and wherein n is a positive integer.

7. The optical transmission/reception method according to claim 6, wherein the optical transmitter and the optical receiver are connected by one optical transmission path instead of the n optical transmission paths, the optical transmitter is further configured to perform operations comprising multiplexing optical signals of n wavelengths obtained by converting each of the n frame signals into optical signals of different wavelengths, and transmitting the multiplexed signal to the one optical transmission path, and the optical receiver is configured to perform operations comprising demultiplexing the multiplexed signal from the one optical transmission path into optical signals of n wavelengths.

8. The optical transmission/reception method according to claim 6, wherein the optical receiver is further configured to perform operations comprising outputting data obtained by synthesizing n pieces of data after removing header information from the generated second frame signal, and performing error correction and decoding on the output data.

\* \* \* \* \*